May 19, 1970 J. M. ROSS 3,512,609
TREE FRUIT HARVESTING PLATFORM
Filed June 9, 1967 5 Sheets-Sheet 1

INVENTOR.
JOHN M. ROSS
BY
Paul A. Weilein
ATTORNEY

FIG. 9.

INVENTOR.
JOHN M. ROSS
BY
Paul A. Weilein
ATTORNEY

United States Patent Office 3,512,609
Patented May 19, 1970

3,512,609
TREE FRUIT HARVESTING PLATFORM
John M. Ross, Upland, Calif., assignor to Sunkist Growers, Inc., Los Angeles, Calif., a corporation of California
Filed June 9, 1967, Ser. No. 644,914
Int. Cl. B60p 1/36
U.S. Cl. 182—129                                  16 Claims

ABSTRACT OF THE DISCLOSURE

A mobile tree fruit harvesting platform moveable to a harvesting position adjacent each tree containing fruit to be harvested, the platform including an elevated harvesting station having a main deck and a number of horizontally hinged laterally extendable and retractible wing decks for supporting workers in harvesting position relative to an adjacent fruit tree, an upper longitudinally extending conveyor on the main deck for receiving picked fruit from the workers and transporting the fruit toward one end of the main deck, a lower fruit loading level having a loading station located below the latter end of the main deck and conveyor means for transporting fruit receiving bins in succession through the station, and a transfer conveyor extending between the upper and lower levels for transferring fruit without crushing or bruising from the outfeed end of the upper conveyor into a bin situated at the loading station.

CROSS REFERENCE TO OTHER APPLICATIONS

Reference is made to copending application Ser. No. 593,481, filed Nov. 10, 1966, now U.S. Pat. No. 3,437,174, and entitled Mobile Platform Construction, disclosing a prior tree fruit harvesting platform.

BACKGROUND OF THE INVENTION

This invention relates generally to agricultural harvesting machines. More particularly, the invention relates to a novel mobile harvesting platform for aiding the harvesting of fruit from fruit trees by hand pickers.

One of the earliest, and still practiced methods of harvesting tree grown fruit, notably citrus fruit, involves the hand picking of the fruit by crews of pickers. Some of these pickers carry ladders to enable them to gather fruit from the upper branches of the fruit trees, while other pickers remain on the ground and gather fruit from the lower branches of the trees. Each picker carries a sack into which he places the harvested fruit. These sacks are periodically emptied into boxes placed at convenient intervals along the rows of trees being harvested. When filled, the boxes are transported, by a fork lift or other vehicle, to a central pickup station, from which the boxes are removed by a transport vehicle.

Recently, harvesting of tree grown fruit has been aided and, more important, accelerated by the development of mobile harvesting platforms. These platforms are movable along the rows of trees containing the fruit to be harvested to a harvesting position adjacent each tree. A typical harvesting platform of this kind has one or more elevated harvesting levels, each having a deck for supporting a crew of fruit pickers in harvesting position relative to an adjacent fruit tree. The harvesting platform may be also equipped with conveyor means for transferring the fruit from the upper harvesting level, or levels, to fruit receivers, such as bins, situated at a lower fruit loading level of the platform. These bins, when filled, are removed by fork lifts or other vehicles and transported to a central pickup location from which they are subsequently carried on a transport vehicle. By way of example, the aforementioned copending application Ser. No. 593,481 discloses a harvesting platform of this kind which is primarily intended for use in harvesting fruit from relatively large fruit trees.

SUMMARY OF THE INVENTION

The invention provides a mobile harvesting platform of the character described having unique horizontally hinged wing decks which extend laterally from the platform, to support fruit pickers in convenient fruit picking positions relative to an adjacent tree and retract laterally toward the platform, to permit unrestricted movement of the platform from the tree, all in such manner as to minimize or completely avoid interference between the tree branches and the wing decks, as well as damage to the branches, during extension and retraction of the decks.

The invention also provides a mobile harvesting platform of the character described wherein each side of the platform mounts a pair of wing decks which may be extended into straddling relation with an adjacent fruit tree and then adjusted toward and away from one another to accommodate trees of different sizes.

The invention also provides a mobile harvesting platform of the character described having a novel conveyor system for receiving harvested fruit from the pickers at the upper harvesting level of the platform and transferring the fruit without crushing or bruising to fruit receivers, or bins, situated at a lower fruit loading level of the platform.

An important feature of the invention is a unique transfer conveyor for transferring the fruit from the upper harvesting level to the lower loading level.

A further feature of the invention is that the mobile harvesting platform is not only adapted for harvesting fruit from trees of normal size and relatively large size, but is additionally adjustable for harvesting fruit from relatively small fruit trees, notably lemon trees.

Other objects and advantages of the invention will be hereinafter described or will become apparent to those skilled in the art, and the novel features of the invention will be defined in the appended claims.

DESCRIPTION OF THE PREFERRED EMBODIMENT

In general terms, the invention provides a mobile tree fruit harvesting platform on a vehicle 12 which is movable to a harvesting position (FIG. 1) adjacent each tree containing fruit to be harvested. The harvesting vehicle includes an erect frame 14 having an elevated harvesting level 16 and a main deck 18 at the harvesting level for supporting a crew of fruit pickers. According to one important feature of the invention, the platform is eequipped with at least one wing deck 20 which is horizontally hinged on the frame 14, adjacent one side of the main deck 18, for vertical swinging about an axis extending generally longitudinally of the harvester vehicle 12 between a normally generally horizontal position of use shown in solid lines in FIG. 4, wherein the wing deck is disposed to support one or more fruit pickers in convenient fruit picking relation to an adjacent tree, and a generally upright retracted position of travel shown in broken lines in FIG. 4, wherein the wing deck is disposed to clear the adjacent tree and thereby permit unrestricted movement of the main deck 18 from the tree. Elevating means 22 are operatively connected between the harvester frame 14 and the wing deck 20 for effecting selective extension and retraction of the latter deck. As will appear from the ensuing description, vertical swinging of the wing deck 20 between its extended and retracted position constitutes an important feature of the invention for the reason that interference between the branches of the adjacent tree or trees and the wing deck, and hence damage to the tree branches, during extension and retraction of the wing deck is minimized or completely eliminated.

Figure 1:
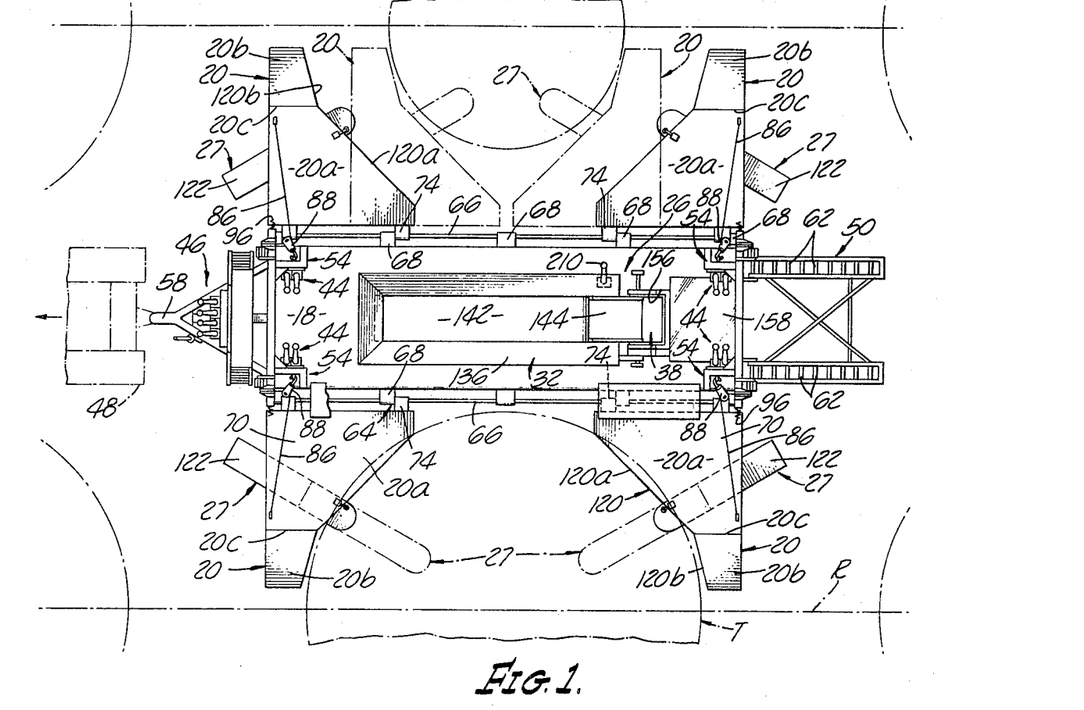
FIG. 1 is a top plan view of a typical mobile tree fruit harvesting platform according to the invention, illustrating the wing decks of the platform extended into straddling relation with opposite fruit trees in two adjacent tree rows.

According to a further important feature of the invention, the wing deck 20 is supported on the harvester frame 14 for movement or adjustment relative to the frame in a generally longitudinal direction of the harvester vehicle 12, and shifting means 24 are provided for moving and positioning the wing deck in this longitudinal direction. This feature of the invention is beneficial for the reason that the wing deck may be adjusted to locate the same in optimum harvesting relation relative to fruit trees of different sizes without movement of the vehicle 12. Longitudinal adjustment of the wing deck 20 has an additional advantage in the illustrated fruit harvesting platform. Thus, the illustrated platform has a total of four wing decks 20. One pair of wing decks are pivotally mounted on the frame 14 along one longitudinal side of the main deck 18, and the remaining pair of wing decks are pivotally mounted on the frame along the opposite longitudinal side of the main deck. This arrangement permits each pair of wing decks to be extended into straddling relation with an adjacent fruit tree T in one tree row R and the other pair of wing decks to be extended into straddling relation with an opposing tree in an adjacent tree row, in the manner illustrated in FIG. 1. Thus, the present harvesting platform permits simultaneous harvesting of fruit from opposing fruit trees in two adjacent tree rows. In this illustrated harvesting platform of the invention, the two wing decks 20 at each side of the platform are independently adjustable longitudinally of the harvester vehicle 12 to vary the spacing between the decks. In this case, then, longitudinal adjustment of the wing decks is advantageous for the reason that each pair of wing decks may be extended into straddling relation with and disposed in optimum harvesting positions relative to trees of different sizes. In FIG. 1, for example, two wing decks 20 on one side of the main deck 18 are longitudinally adjusted to their maximum spacing to permit these decks to straddle a relatively large fruit tree, while the opposite two wing decks are longitudinally adjusted to their minimum spacing to straddle a relatively small fruit tree. An additional advantage of the longitudinal wing deck adjustment proposed by the present invention is that the decks may be longitudinally positioned to clear the branches of the adjacent fruit trees prior to extension and retraction of the wing decks, whereby interference between the tree branches and the decks, and resultant damage to the branches, during extension and retraction of these decks is minimized or eliminated. Each wing deck has an extendable walkway 27.

According to another important feature of the invention, the present mobile harvesting platform is equipped with novel conveyor means 26 for receiving picked or harvested fruit from the fruit pickers at the upper harvesting level 16 and transferring this fruit, without crushing, bruising or other damage, to fruit receivers, or bins, 28 situated at a lower loading level 30 of the platform. Generally speaking, the conveyor means 26 includes an upper conveyor 32 at the upper harvesting level 16 for receiving harvested fruit from the fruit pickers, a lower conveyor 34 at the lower loading level 30 for supporting the fruit receiving bins 28 and transporting these bins successively through a loading station 36 (FIG. 1) at the latter level, and a transfer conveyor 38 extending between the two levels for transferring or conveying the fruit from the upper conveyor into a pin situated at the loading station.

One particularly unique feature of the conveyor means resides in the fact that the transfer conveyor 38 is supported on the harvester frame 14 for generally vertical movement of its lower, outfeed end into and out of the fruit bin 28 at the loading station 36 through the open top of the bin. Operatively connected between the frame 14 and the transfer conveyor 38 is hydraulic means 40 (FIG. 3) for lowering the latter conveyor into and raising the conveyor out of each bin.

The various elevating and shifting means and conveyors of the illustrated harvesting platform are hydraulically operated and controlled by a hydraulic system embodied in the machine. This hydraulic system includes four wing deck control stations 44 (FIG. 1) at the upper harvesting level 16 and a conveyor control station 46 at the lower loading level 30. The four wing deck control stations 44 are located adjacent the four wing decks 20, respectively, and each contains controls for operating or controlling the elevating means 22 and shifting means 24 for the adjacent wing back. The conveyor control station 46 is located at the front end of the harvesting platform and includes controls for operating or controlling the conveyors 32, 34, and 38 and the transfer conveyor elevating means 40.

While a mobile harvesting platform according to the invention conceivably may be self-propelled, the illustrated platform is essentially a trailer which is adapted to be towed by a tractor 48 (FIG. 1). In this case, the hydraulic system 42 of the platform receives high pressure hydraulic fluid from and returns low pressure hydraulic fluid to the tractor hydraulic system. The overall hydraulic system is shown diagrammatically in FIG. 9.

Figures 4, 8:
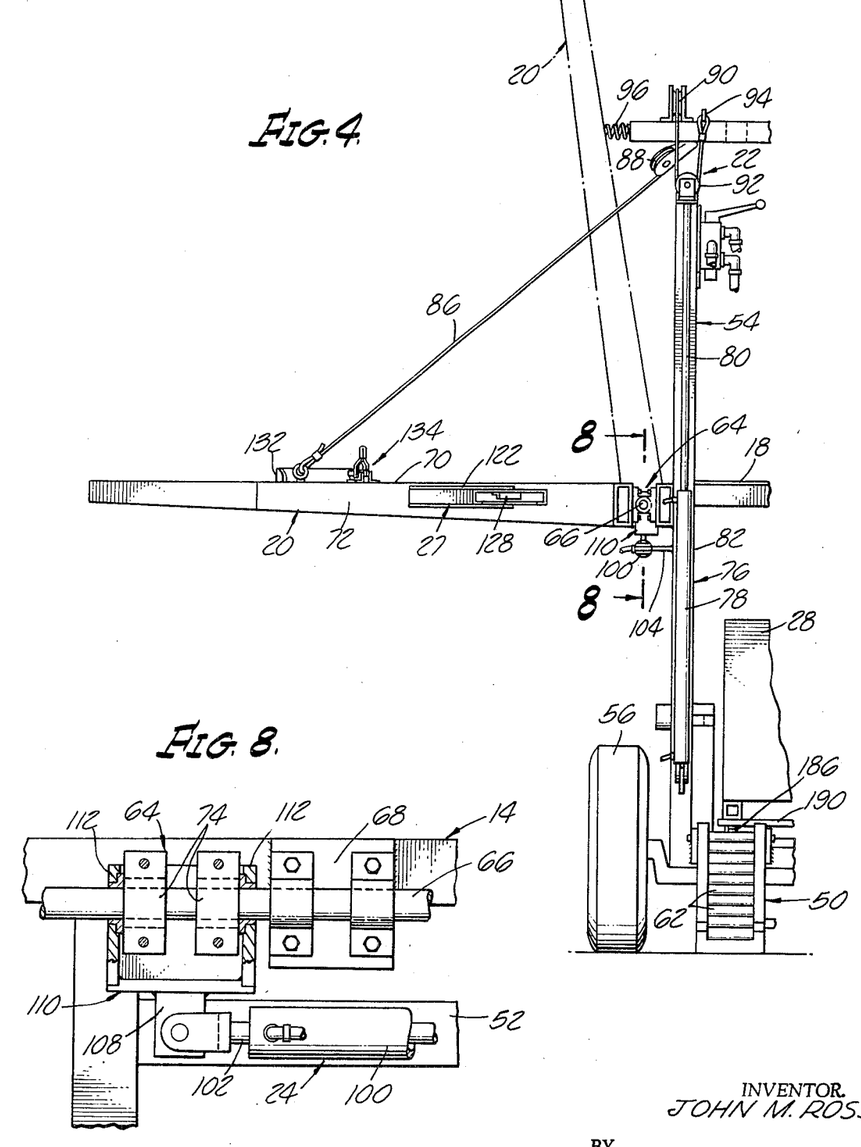
FIG. 4 is a fragmentary rear end elevation of the harvesting platform looking in the direction of the arrows on line 4—4 in FIG. 3.
FIG. 8 is an enlarged section taken on line 8—8 in FIG. 4.

Briefly, in harvesting operation of the present mobile tree fruit harvesting platform, the wing decks 20 are normally retracted to their broken line upright positions of FIG. 4. In these positions of the wing decks, the platform is conditioned for movement through a corridor between two adjacent rows of fruit trees. In this regard, attention is directed to the fact that the platform is laterally dimensioned to provide the platform with an overall width, when the wing decks are retracted, which is slightly less than the average corridor width in the fruit tree grove in which a platform is to be used. The platform is towed to a harvesting position between two laterally opposing trees in the rows, wherein the wing decks are laterally aligned with the regions between adjacent trees in the respective rows. The wing decks are then swung downwardly to their extended positions between the adjacent trees. Thereafter, two wing decks at each side of the platform are moved longitudinally toward one another, and thus toward the intervening fruit tree, to positions wherein the decks are located in close proximity to or, in some cases, between the tree branches. The wing deck walkways 27 are then extended inwardly of the adjacent tree, toward the tree trunk, all as illustrated in broken lines in FIG. 1. At this point, the fruit picking crew at the upper harvesting level 16 of the platform move outwardly along the extended wing decks and deck walkways and commence picking the fruit from the adjacent trees. These pickers will normally carry sacks onto which they place the fruit. When a picker's fruit sack has been filled, he returns to the main deck 18 of the platform and empties the fruit from his sack onto the upper conveyor 32.

Conveyor 32, which may be operated continuously during harvesting, transports the fruit to the upper infeed end of the transfer conveyor 38. This transfer conveyor then transfers the fruit, without bruising, from the upper harvesting level 16 into a bin 28 currently situated at the loading station 36 of the lower loading level 30 of the platform. As hereinafter explained, the transfer conveyor is gradually raised as the bin is filled. After the bin has been filled to capacity, the lower conveyor means 34 is operated to transport the filled bin 28 from the loading station 36 to an outfeed ramp 50 of the platform and at the same time to move an empty bin to fruit receiving position at the loading station.

At the same time that the picking crew at the upper harvesting level 16 of the harvesting platform is harvesting the fruit from the upper tree branches, the fruit on the lower tree branches is harvested by a second crew situated on the ground.

After the fruit accessible from the upper level 16 of the harvesting platform has been properly harvested, the picking crew at this level return to the main deck 18 of the platform and retract the wing decks 20. The platform is then moved to a new harvesting position between following trees in the adjacent tree rows, and the above harvesting procedure is repeated.

Referring now in more detail to the embodiment of the invention illustrated by the drawings, the harvester frame 14 comprises a number of longitudinal, transverse, and upright frame members which are welded or otherwise rigidly joined to form an open, generally rectangular, longitudinally extended framework. The main deck 18 of the platform may comprise metal plates, or the like, which are rigidly fastened to upper horizontal frame members of this framework. The main deck has a generally rectangular shape which is elongated lengthwise of the harvesting platform, as shown best in FIG. 1. Rising above the main deck 18, at the four corners thereof, are upstanding frameworks 54 which constitute, in effect, and will be hereinafter referred to as supporting posts.

As noted earlier, while the vehicle 12 of the present harvesting platform conceivably may be self-propelled, the illustrated vehicle comprises a trailer which is adapted to be towed by a tractor 48. The illustrated harvesting vehicle has four ground wheels 56 which are mounted in pairs, at opposite sides of the harvester frame 14, just slightly to the rear of its center of gravity. Extending from the forward end of the frame is a tongue 58 mounting a hitch 60 for pivotally connecting the harvester vehicle to its towing tractor 48.

Figure 2:
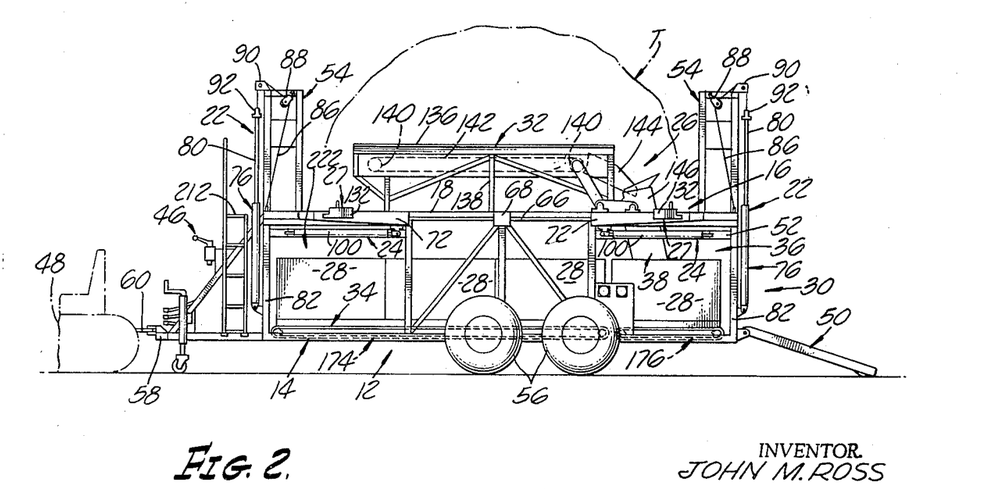
FIG. 2 is a side elevation of the harvesting platform in FIG. 1.

The outfeed ramp 50 of the platform is hingeably mounted on the rear end of the frame 14, on a horizontal transverse axis of the frame, for vertical swinging movement of the ramp between its extended position of use illustrated in FIG. 2, wherein the ramp slopes downwardly and has its rear end resting on the ground, and a retracted position of travel (not shown), wherein the ramp is elevated clear of the ground, preferably against the rear end of the harvester frame 14. Suitable latch means (not shown) in provided for locking the ramp in this retracted position. The outfeed ramp has rollers 62 (FIG. 1), or the like, to permit the fruit receiving bins 28 to slide downwardly along the ramp.

The two wing decks 20 at each side of the platfrom are pivotally mounted by means 64 (FIG. 3) along the adjacent longitudinal side of the main deck 18. The mounting means 64 for each wing deck pair comprises a pivot shaft 66 which extends longitudinally of the frame 14, along the adjacent longitudinal edge of the main deck 18. It is assumed, in this description, that each pivot shaft 66 is a long unitary shaft. However, each pivot shaft may comprise two separate shafts arranged end to end.

Each pivot shaft 66 is rigidly attached to the adjacent longitudinal edge of the main deck 18 by a number of supporting brackets 68. For reason which will appear presently, the supporting brackets for each pivot shaft are arranged in spaced relation along the shaft. In the drawings, for example, each pivot shaft is supported by five brackets, two of which are located at the extreme ends of the shaft, one of which is located at the center of the shaft, and the remaining two of which are located approximately midway between the end and center brackets. The pivot shafts 66 of the illustrated harvesting platform are fixed against both rotation and axial movement.

Each wing deck 20 has a top plate 70 perimetrically bounded by a depending flange 72. As will be explained presently, each illustrated wing deck 20 is made in two sections which are welded or otherwise rigidly joined for ease of manufacture.

Figures 5, 7:
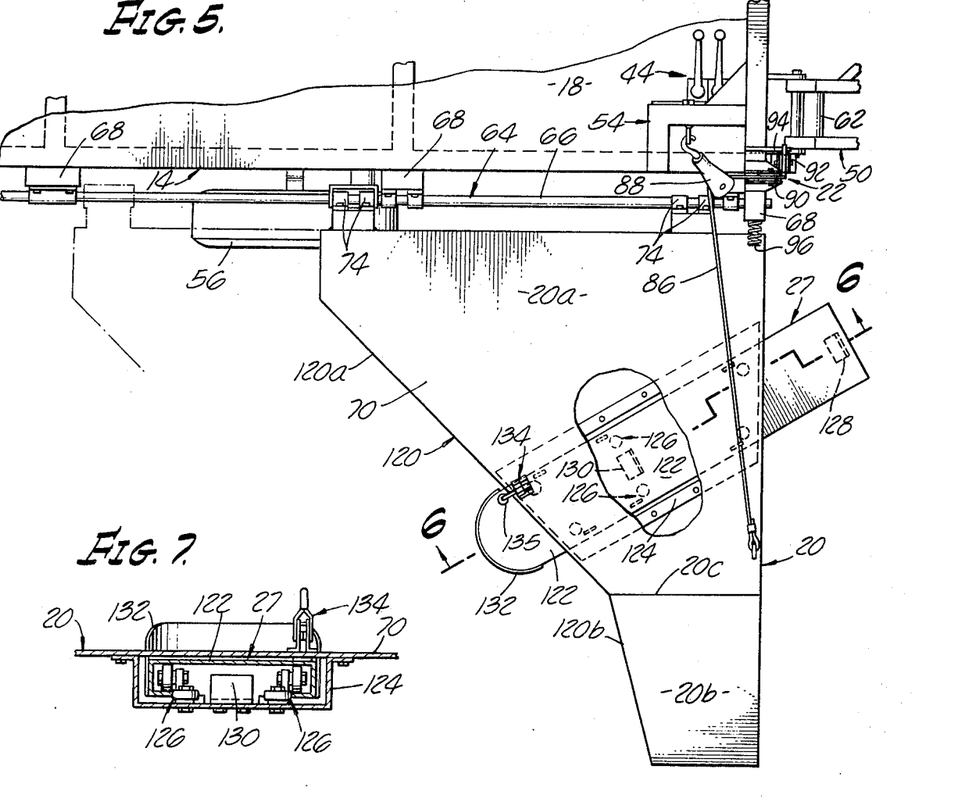
FIG. 5 is an enlarged fragmentary top plan view of the harvesting platform illustrating, in particular, one of the laterally extendable and retractible wing decks of the platform in its extended position.
FIG. 7 is a section taken on line 7—7 in FIG. 6.

Rigidly secured to the flange 72 of each wing deck, along the inner longitudinal side of the deck, is a pair of slide bearings 74 which are slidably and rotatably mounted on the adjacent pivot shaft 66. Referring particularly to FIGS. 1 and 5, it will be observed that the two slide bearings 74 of each wing deck are disposed in straddling relation to a supporting bracket 68 for the corresponding pivot shaft 66. It is now evident that each wing deck 20 is supported on its respective pivot shaft for vertical swinging movement about the shaft, laterally of the harvester frame 14, and axial movement along the shaft, longitudinally of the frame. Longitudinal movement of each wing deck in one direction is limited by engagement of its slide bearings 74 with two adjacent end supporting brackets 68 of its respective pivot shaft. Longitudinal movement of each wing deck in the opposite direction is limited by engagement of its slide bearings with the two adjacent inner supporting brackets of its pivot shaft. These limiting longitudinal positions of the wing decks are indicated in solid and broken lines in the upper half of FIG. 1.

Figure 3:
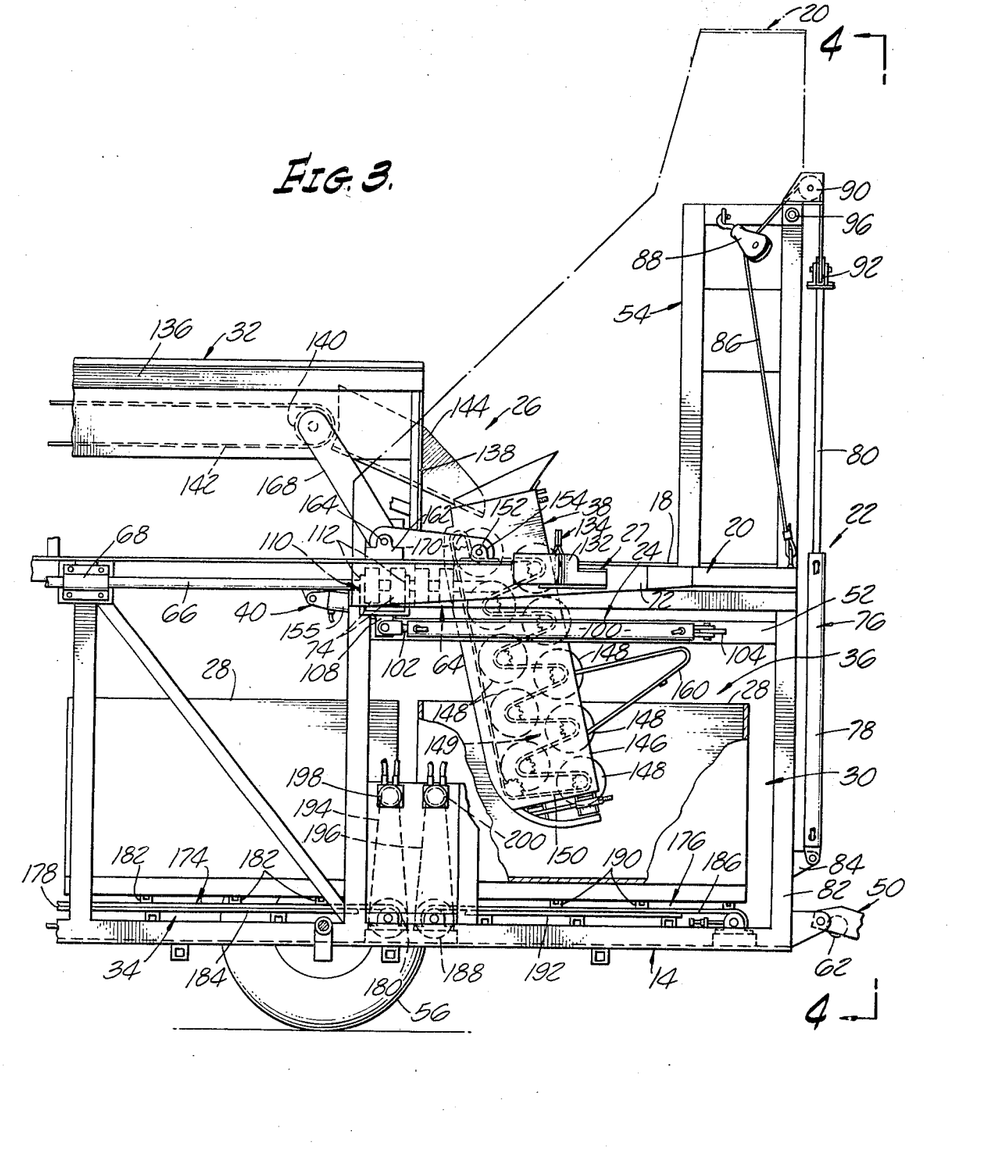
FIG. 3 is an enlarged, fragmentary side elevation of the rear end of the harvesting platform with parts broken away for the sake of clarity.

It will be recalled that each wing deck 20 is vertically swung or rotated between its laterally extended and retracted positions relative to the harvester frame 14 by an elevating means 22. Referring particularly to FIGS. 3 and 4, it will be observed that the elevating means for each wing deck includes a linear fluid pressure actuator 76, in this instance a double acting hydraulic actuator. Each actuator has a cylinder 78 and a plunger 80. The actuator 76 for each wing deck is disposed in a generally upright position alongside an upright frame member 82 of the harvester frame 14 adjacent the respective wing deck. The lower end of each actuator cylinder 78 is pivotally attached to a bracket 84 rigid on the lower end of the adjacent frame member 82. The plunger 80 of each actuator extends from the upper end of its respective cylinder 78.

As shown in FIGS. 3 and 4, each actuator plunger 80 is operatively connected to the adjacent wing deck 20 by means of a cable 86. One end of the cable is attached to the upper side of the corresponding wing deck, adjacent the outer extremity of the deck. Each cable extends upwardly from its wing deck to a first cable guide or pulley 88 attached to the upper end of the adjacent frame corner post 54, then through a second cable guide or pulley 90 on the upper end of the post, then downwardly through a cable guide or pulley 92 mounted on the upper end of the adjacent actuator plunger 80, and finally upwardly from the latter pulley to a cable anchor 94 attached to the upper end of the adjacent frame post.

It is now evident, therefore, that downward retraction of each actuator plunger 80 into its respective cylinder 78 is effective to rotate the corresponding wing deck 20 upwardly from its solid line extended position of FIG. 4 to its broken line retracted position of that figure. Upward extension of the plunger from the cylinder permits downward rotation of the wing deck from its retracted position to its extended position under the force of gravity. Retraction of each wing deck is limited by engagement of the deck with a spring bumper 96 mounted on the upper end of the adjacent frame corner post 54. In their fully retracted positions, the upper ends of the wing decks incline outwardly at a small angle, such that gravity is effective to swing the decks to their extended positions in response to extension of their respective actuator plungers.

Referring now particularly to FIGS. 3 and 4, the longitudinal shifting means 24 for each wing deck 20 comprises a double-acting hydraulic cylinder 100 containing a plunger 102. The several actuator cylinders 100 are horizontally disposed directly below the pivot shafts 66 for the respective wing decks. The closed end of each actuator cylinder 100 is pivotally attached to a bracket 104 rigid on an adjacent longitudinal frame member 52 of the harvester frame 14. It will be observed that the pivoted ends of the cylinders are located adjacent the front and rear ends, respectively, of the frame. As best shown in FIG. 8, the outer end of each actuator plunger 102 is pivotally attached to a depending arm 108 on a slide 110. Each slide 110 has a generally channel shape in horizontal cross section and includes spaced vertical flanges 112 which are fitted with bushings slidably receiving the adjacent pivot shaft and which straddle the adjacent wing deck slide bearing 74. It is now evident, therefore, that each wing deck 20 may be moved and positioned along its respective pivot shaft 66 and longitudinally of the harvester frame 14 by its corresponding actuator cylinder 100.

Figure 9:
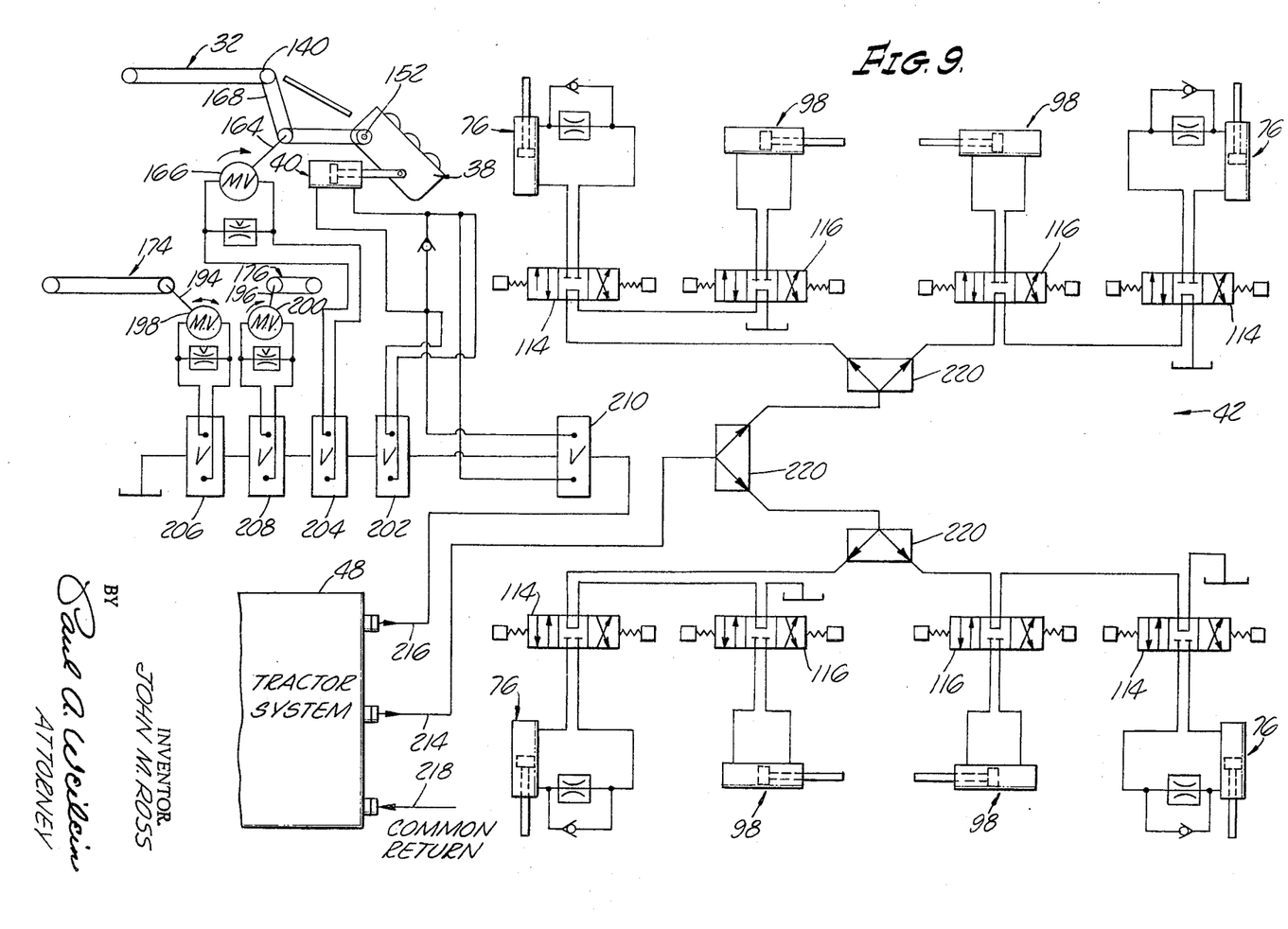
FIG. 9 is a schematic circuit diagram of a hydraulic system embodied in the harvesting platform.

As noted earlier, the hydraulic system of the harvesting platform includes four local wing deck control stations 44 located at the four corners, respectively, of the main deck 20. Referring now to FIG. 9, each of these control stations has a valve 114 for controlling the corresponding elevating actuator 76 and a valve 116 for controlling the corresponding shifting actuator 98 of the adjacent wing deck 20. The valve 114, 116 of each local control station are mounted on the upper end of the adjacent frame corner post 54. Thus, the wing decks may be independently and selectively extended and retracted laterally of the harvester frame 14, and moved and positioned longitudinally of the frame, from the corresponding local control station.

As shown best in FIGS. 1 and 5, each wing deck 20 is of generally triangular shape in plan view and has a longitudinal inner side edge 120 that is at an angle relative to the longitudinal direction of the harvester frame 14. This inner edge of each wing deck includes edge portions 120a and 120b which are disposed at an obtuse angle relative to one another, as shown, to provide the edge with a contour which conforms roughly to the arcuate outline of one quadrant of a fruit tree. For easier fabrication, each wing deck is constructed in two sections 20a and 20b having abutting edges 20c which are welded together.

Figure 6:
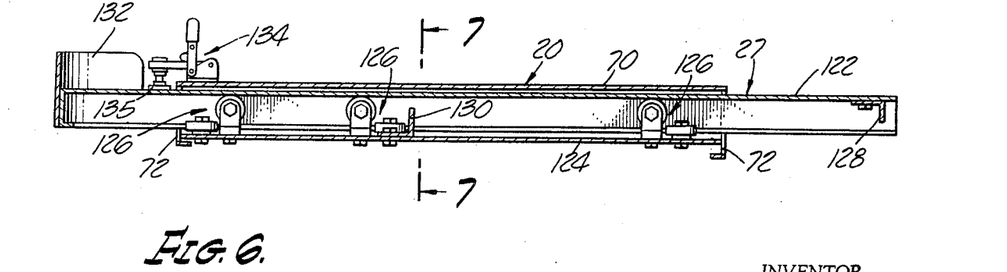
FIG. 6 is an enlarged section taken on line 6—6 in FIG. 5 through an extendable walkway embodied in the illustrated wing deck.

As shown in FIGS. 5, 6, and 7, the walkway 27 of each wing deck 20 comprises a relatively long, narrow metal plank 122 of channel shaped cross section disposed below the corresponding wing deck 20, with the longitudinal axis of the plank extending at an acute angle relative to the pivot axis of the wing deck and with the ends of the plank extending through openings in the depending wing deck flanges 72. Rigidly fastened to the underside of each wing deck is an open ended housing 124 which encloses the portion of the adjacent walkway which underlies the wing deck. This housing mounts sets 126 of horizontal and vertical rollers which engage the upper web section, the lower flanges, and the flange edges of the adjacent walkway plank, to support the walkway 27 for endwise movement relative to the corresponding wing deck 20. Extension of each walkway 27 relative to its wing deck 20 is limited by engagement of a limit stop 128 on the rear end of the walkway with a limit stop 130 on its housing 124. Retraction of each walkway is limited by engagement of a curved upstanding flange 132 on the forward end of the walkway with the respective wing deck. The flange 132 also serves a safety function in that it indicates the location of the forward end of the plank to a picker standing on the walkway. Mounted on each wing deck 20 is a readily releasable clamping or locking means 134 having a retractible pressure member 135 for releasably locking the corresponding walkway against endwise movement in any position of adjustment. Such a clamp is designated a "Standard Series" clamp manufactured by American Drill Bushing Co., Los Angeles, Calif.

It will be recalled that the conveyor means 26 of the illustrated harvesting platform 10 includes an upper conveyor 32, a lower conveyor means 34, and a transfer conveyor 38. Referring particularly to FIGS. 1, 2, and 3, the upper conveyor 32 will be seen to comprise an elongate, generally trough-shaped housing 136 having an open top and one open end. The upper edge portions of the conveyor housing side walls flare outwardly, as shown. Conveyor housing 136 extends lengthwise of the main deck 18 and is centered both longitudinally and laterally of this deck to provide walking space along the two sides and the front end of the housing. The conveyor housing is supported at a convenient elevation above the main deck by means of a supporting framework 138. The open end of the housing is located adjacent the rear end of the main deck. Rotatably mounted within opposite ends of the conveyor housing 136, between the longitudinal side walls of the housing, are rollers 140 around which is trained an endless conveyor belt 142. The width of this belt is just slightly less than the spacing between the longitudinal side walls of the housing.

Mounted within the rear open end of the conveyor housing 136 is a chute 144 which slopes downwardly in the direction of its rear end. The forward end of the chute is located in close, fruit receiving relation to the rear end of the conveyor belt 142.

As noted earlier, the transfer conveyor 38 is intended to receive picked or harvested fruit from the upper conveyor 32 and to transfer the fruit without bruising or other damage to a fruit receiving bin 28 located at the lower loading station 36 of the housing platform. The platform may employ various conveyor devices for this purpose. The particular transfer conveyor illustrated in the drawings is assumed to be of the type disclosed in copending application Ser. No. 644,835, filed June 9, 1967 and entitled Live Roller Conveyor for Discrete Articles Such as Fruit.

The transfer conveyor 38 has a housing 146 with an open upper infeed end and an open lower outfeed end and containing a number of driven, resiliently compliant or spongy conveyor feed rollers 148 which are driven by a chain 150 and which define a conveyor path 149 extending between the infeed and outfeed ends of the conveyor housing. As indicated in dotted lines in FIG. 3, the spongy rollers 148 are arranged in two staggered rows on opposite sides of the conveyor path 149 and the rollers of the two rows rotate in opposite directions to yieldingly grip and lower the pieces of fruit.

The transfer conveyor 38 has a combined driving and supporting shaft 152 at the upper infeed end of the conveyor housing 146. This shaft extends laterally of both the transfer conveyor and the platform and is rotatably supported, at its outboard ends, in bearings 154 mounted on the main deck 18 of the platform, just beyond the rear end of the upper conveyor housing 136. Shaft 152 supports the transfer conveyor housing 146 for vertical swinging movement of its lower outfeed end within the lower fruit loading station 36 of the platform. The elevating means 40 for the transfer conveyer comprises a double acting hydraulic actuator 155 pivotally connected to the platform frame 14 and the conveyor housing 146.

The upper infeed end of the transfer conveyor housing 146 is disposed within an opening 156 within the main deck 18. The rear end of this opening is laterally enlarged and opens through the rear edge of the main deck. Opening 156 is normally closed by a transparent plate 158 which is hinged along its rear edge to the rear edge of the main deck for vertical swinging movement about an axis extending laterally of the platform.

The transfer conveyor housing 146 mounts a rearwardly extending arm 160 which is engageable with the hinged plate 158 to swing the latter upwardly from the main deck opening 156 during upward swinging movement of the transfer conveyor, in a manner hereinafter explained, and thereby accommodate upward movement of the lower end of the transfer conveyor into the opening. The plate 158 returns to its normal position within the opening by gravity when the transfer conveyor is lowered. When in its normal closed position, the hinged plate 158 is supported on the main deck 18 to permit workers to stand on the plate.

Rotatably supported in bearings 162 (only one shown) mounted on the main deck 18, between the rear roller 140 of the upper conveyor 32 and the upper infeed end of the transfer conveyor 38 is a drive shaft 164. This shaft is driven by a hydraulic motor 166 (FIG. 9) mounted on the main deck. Drive shaft 164 is drivably connected to the rear roller 140 of the upper conveyor by a chain drive 168 and to the combined drive and supporting shaft 152 of the transfer conveyor 146 through a chain drive (not shown) enclosed within a chain housing 170. The conveyor motor 166 drives the rear roller 140 of the upper conveyor and the driving shaft 152 of the transfer conveyor in clockwise directions, as the platform is viewed in FIG. 3. It is now evident, therefore that the conveyor belt 142 of the upper conveyor 32 is driven in a direction such that the upper run of the belt travels rearwardly through the conveyor housing 136 and toward the rear conveyor chute 144. The driving shaft 152 of the transfer conveyor is drivingly coupled to the conveyor feed rollers 148 by a chain and sprocket arrangement (not shown) to drive the rollers 148 in the proper directions to convey the fruit downwardly.

The lower conveyor means 34 of the harvesting platform 10 comprises two separate conveyors, to wit, an infeed conveyor 174 and an outfeed conveyor 176. The infeed conveyor 174 extends along the bottom of the harvester frame 14, at the lower loading level 30 of the frame, within the region between the front end and the rear loading station 36 of the frame. The outfeed conveyor 176 extends along the bottom of the frame, through the loading station, in the region between the rear end of the infeed conveyor and the front end of the outfeed ramp 50.

The infeed conveyor 174 comprises a pair (only one shown) of endless conveyor chains 178 which extend longitudinally of the frame 14, adjacent opposite sides thereof, and around sprockets 180. Extending between and secured to the conveyor chains 178, at uniformly spaced intervals therealong, are a number of transverse flight bars 182. The upper runs of the conveyor chains 178 are slidably supported on guide 184 mounted on and extending lengthwise of the frame 14.

Similarly, the outfeed conveyor 176 comprises a pair of sprocket chains 186 extending lengthwise of the harvester frame 14, adjacent opposite sides thereof, and around sprockets 188 rotatably mounted on the frame. Extending between and secured to the outfeed conveyor chains 186, at uniformly spaced intervals therealong, are a number of transverse flight bars 190. The upper runs of the conveyor chains 186 are slidably supported on guides 192 mounted on and extending lengthwise of the frame 14. As shown best in FIG. 3, the adjacent ends of the conveyors 174, 176 are disposed in close proximity to one another. The cprockets 180, 188 at these latter ends of the conveyors are drivably coupled, by corresponding chain drives 194, 196, to hydraulic motors 198, 200, respectively, mounted on the frame 14. Motors 198, 200 drive the infeed and outfeed conveyors 174, 176, respectively, in directions such that the upper runs of their conveyor chains travel rearwardly relative to the harvester frame 14.

As noted earlier, the hydraulic system includes a conveyor control station 46 (FIG. 1) located at the front end of the harvester frame 14 and, as shown diagrammatically in FIG. 9, the control station has four valves 202, 204, 206, 208. These four valves control, respectively, the hydraulic means 40 to raise and lower the transfer conveyor 38, drive motor 166 for the upper conveyor 32 and the transfer conveyor 38, the infeed conveyor drive motor 198, and the outfeed conveyor drive motor 200. An emergency valve 210 is situated at the upper harvesting level for operation by a worker who can view the lower end of the transfer conveyor through the hinged plate 158.. This valve can override the control valve 202 and control, independently thereof the hydraulic means 40 of the transfer conveyor. Convenient access to the elevated main deck 18 of the platform is provided by ladders 212 at the front end of the platform.

Referring now particularly to FIG. 9, it will be observed that the hydraulic system of the harvesting platform is generally conventional and thus need not be explained in detail. Suffice it to say that the hydraulic system has two high pressure hydraulic fluid supply lines 214, 216 and one low pressure hydraulic fluid return line 218. The high pressure lines have releasable couplings for connecting these lines to the high pressure side of the hydraulic system of the towing tractor 48 for the platform. The low pressure return line 218 has a releasable coupling for connecting this line to the low pressure side of the tractor hydraulic system. High pressure line 214 connects, through flow dividers 220, to the high pressure inlets of the several wing deck elevating and shifting control valves 114, 116 located at the local wing deck control stations 44. The high pressure line 216 connects to the high pressure inlets of the several control valves 202, 204, 206, 208, and 210. Low pressure line 218 connects to the low pressure outlets of the several valves.

The operation of the illustrated mobile fruit harvesting platform may be readily understood. The platform is towed to a harvesting position between laterally opposed trees in two tree rows with the wing decks 20 of the platform retracted. With a pair of wing decks 20 well spread apart, the crew of fruit pickers at the upper harvesting level 16 of the platform operate the wing deck elevating control valves 114 to effect lowering of the wing decks 20 to their extended, horizontal positions of use illustrated in FIG. 1 and in solid lines in FIG. 4. In this regard, it will be recalled that a significant advantage of the invention resides in the fact that vertical swinging movement of the wing decks between their extended and retracted positions enables these decks to be extended and retracted with minimum interference with, and thereby minimum damage of, the adjacent fruit trees. After the wing decks have been extended, the wing deck shifting control valves 116 are operated, if necessary, to move the two wing decks at each side of the platform toward one another to optimum harvesting positions relative to the branches of the intervening tree. As noted earlier, this relative longitudinal adjustment of the two wing decks at each side of the platform is beneficial for the reason that the wing decks may be located in optimum harvesting positions relative to trees of various sizes without movement of the platform. In this regard, for example, it will be recalled that FIG. 1 illustrates one pair of wing decks adjusted to their maximum spacing to accommodate a relatively large tree and the other pair of wing decks adjusted to their minimum spacing to accommodate a relatively small tree.

After the harvesting platform has thus been conditioned for harvesting operation, the conveyor motor 166 is pressurized to operate the upper conveyor 32 together with the transfer conveyor 38 and the fruit pickers at the upper harvesting level 30 walk outwardly along the extended wing decks 20 and commence picking fruit from the adjacent fruit trees. The wing deck walkways 27 are extended, as necessary, to enable the pickers to reach fruit adjacent the trunk of the tree. In this regard, it is evident that the oblique attitudes of the walkways is such that they extend generally inwardly toward the trunks of the adjacent trees. As may be best observed in FIG. 1, the main deck 18 and wing decks 20 of the harvesting platform effectively surround and thereby enable picking of fruit from substantially a full 180°, or more of each adjacent fruit tree.

When the sack carried by each fruit picker is filled to capacity, he returns to the main deck 18 of the platform and empties the contents of the sack onto the upper conveyor 32. This fruit is conveyed by the belt to the conveyor chute 144 and rolls downwardly through the chute into the infeed end of the transfer conveyor 38. The transfer conveyor conveys the fruit from the upper harvesting level 30 to the loading station 36 and discharges the fruit into the fruit receiving bin 28 currently situated at the loading station.

With regard to the transfer conveyor 38, attention is directed to FIG. 3, wherein it will be observed that during normal harvesting operation of the platform the lower end of the transfer conveyor 38 projects downwardly into a bin 28 situated at the loading station 36. In its lower limiting position of FIG. 3, the lower outfeed end of the conveyor is located adjacent the bottom of the bin, whereby fruit discharging from the latter end of the conveyor may drop into the bin without bruising. The lower end of the transfer conveyor is slowly elevated, by the hydraulic actuator 40 as the fruit level in the bin rises. During this elevation of the transfer conveyor, the conveyor arm 160 engages the hinged main deck plate 158 to elevate this plate and thereby permit elevation of the transfer conveyor completely from the underlying bin as the fruit level approaches the top of the bin.

When the fruit receiving bin 28 currently at the loading station 36 is finally filled to capacity, the transfer conveyor 38 is elevated to its upper limiting position, wherein the lower end of the conveyor clears the bin for movement of the bin from the loading station. At this point, the outfeed conveyor 176 is operated to drive the filled bin from the loading station to the outfeed ramp 50. The bin then slides downwardly along this ramp to a position where the bin can be removed to a central pickup location by a fork lift or other vehicle. The infeed conveyor 174 is now operated to advance an empty bin 28 to the loading station. The transfer conveyor 32 is relowered into the empty bin to commence filling the same. Referring particularly to FIG. 2, it will be observed that the harvester frame 14 has forward lateral openings 222 through which empty bins may be placed on the forward end of the infeed conveyor 174, by a fork lift, for example, to maintain a continuous supply of empty bins on the infeed conveyor.

After harvesting of the fruit from each pair of trees, the wing decks 20 are retracted and the harvesting platform is towed to the next pair of trees. The wing decks are then re-extended and the harvesting procedure is repeated. It will be understood, of course, that the fruit on the lower branches of the trees is harvested by picking crews on the ground.

While specific structural details have been shown and described, it should be understood that changes and alterations may be resorted to without departing from the spirit of the invention as defined in the appended claims.

What is claimed is:

1. A mobile tree fruit havesting platform comprising:
a vehicle movable to a harvesting position adjacent each tree containing fruit to be harvested and including an erect frame having an elevated harvesting level, a main deck at said level extending longitudinally of said vehicle for supporting a worker in harvesting position relative to an adjacent tree, a lower fruit receiving level, and means at said lower level for supporting a fruit receiver at a fruit receiving station below one end of said deck;
an upper conveyor mounted on and existing longitudinally of said deck on which said worker may place fruit picked from said adjacent tree, said conveyor including an outfeed end adjacent said one end of said deck and means for transporting fruit placed on said conveyor to said outfeed end; and
a transfer conveyor mounted on said frame adjacent said one end of said deck, said transfer conveyor extending between said levels and including an upper infeed end situated adjacent said outfeed end of said upper conveyor for receiving fruit from said upper conveyor, a lower outfeed end situated at said fruit receiving station for discharging fruit into said fruit receiver, and means for transporting fruit without bruising from said infeed end to said outfeed end of said transfer conveyor.

2. A harvesting platform according to claim 1 wherein:
said fruit receiver is a bin having a top opening, and
said platform further comprises means supporting said transfer conveyor on said frame for generally vertical movement of said outfeed end of said transfer conveyor into and from said bin through said open top thereof, and elevating means operatively connected between said frame and transfer conveyor for effecting vertical movement of the latter conveyor.

3. A harvesting platform according to claim 2 wherein:
said transfer conveyor supporting means comprise pivot means pivotally supporting the upper end of said transfer conveyor for swinging movement of said transfer conveyor about a normally generally horizontal pivot axis extending transversely of said vehicle.

4. A harvesting platform according to claim 3 wherein:
said receiver supporting means comprises lower conveyor means at said lower level of said platform for transporting said bin longitudinally of said vehicle toward the end thereof adjacent said one end of said deck.

5. A harvesting platform according to claim 4 wherein:
said lower conveyor means comprises an infeed conveyor for transporting said bin to said receiving station and an outfeed conveyor for transporting said bin through said receiving station, and
means for independently driving said infeed and outfeed conveyors.

6. A mobile tree fruit harvesting platform comprising:
a vehicle movable to a harvesting position adjacent each tree containing fruit to be harvested and including an erect frame having an elevated harvesting level and a main deck at said level;
at least one wing deck,
means pivotally mounting said wing deck on said frame adjacent one side of said main deck for swinging about an axis extending generally longitudinally of said vehicle between a normally generally horizontal extended position of use, wherein said wing deck projects laterally from said main deck and is disposed to support a worker in harvesting position relative to an adjacent tree to be harvested, and a generally upright retracted position of travel, wherein said wing deck is disposed to clear said adjacent tree from restricted movement of said platform to another tree,
said wing deck mounting means including means supporting said wing deck on said frame for movement relative to said frame in a generally longitudinal direction of said vehicle,
said platform further comprising shifting means operatively connected between said frame and wing deck for moving and positioning said wing deck in said generally longitudinal direction; and elevating means operatively connected between said frame and wing deck for effecting selective extension and retraction of said wing deck.

7. A mobile tree fruit harvesting platform comprising:

a vehicle movable to a harvesting position adjacent each tree containing fruit to be harvested and including an erect frame having an elevated harvesting level and a main deck at said level;

at least one wing deck, means pivotally mounting said wing deck on said frame adjacent one side of said main deck for swinging about an axis extending generally longitudinally of said vehicle between a normally generally horizontal extended position of use, wherein said wing deck projects laterally from said frame and is disposed to support a worker in harvesting position relative to an adjacent tree to be harvested, and a generally upright retracted position of travel, wherein said wing deck is disposed to clear said adjacent tree from restricted movement of said platform to another tree, said wing deck mounting means including a pivot shaft on said frame along one longitudinal side of said main deck, and means mounting said wing deck on said shaft for rotation about an axial movement along said shaft, whereby said wing deck may be extended and retracted relative to said frame and moved relative to said frame longitudinally of said vehicle, said platform further comprising shifting means operatively connected between said frame and wing deck for moving and positioning said wing deck along said shaft; and elevating means operatively connected between said frame and wing deck for effecting selective extension and retraction of said wing deck.

8. A harvesting apparatus of the character described, comprising:

a vehicle having an elevated central platform for harvesting personnel, said platform having opposite longitudinal sides; and a pair of wing decks mounted on at least one of the two longitudinal sides of said platform, said wing decks being spaced apart longitudinally of the platform, said wing decks being movable between retracted positions to reduce the width of the vehicle and substantially horizontal operating positions extended laterally of the vehicle, said wing decks being both rotatably and longitudinally slidable about axes extending longitudinally of the vehicle; and power means to rotate the wing decks about said axes for extending and retracting the wing decks and to move the wing decks longitudinally of said axes for varying the spacing between the two wing decks, said wing decks being movable relative to each other longitudinally of the platform for varying the spacing between the two wing decks between a maximum spacing to straddle and clear a relatively large tree and a substantially lesser spacing to clear a smaller tree, whereby the vehicle may be moved into a position alongside a tree and then with the two wing decks spaced apart sufficiently to clear the tree, the two wing decks may be extended without damage to the tree to operating positions straddling the tree and then relative movement may be caused between the two wing decks to bring the two wing decks into positions intimately straddling the tree.

9. A harvesting apparatus according to claim 8 wherein:

said wing decks have confronting edges which diverge toward the outer ends of the respective wing decks and are shaped to conform generally to the outline of a tree.

10. In a mobile tree fruit harvesting apparatus, the combination of:

a vehicle;

an elevated platform structure on the vehicle extending laterally from both sides of the vehicle on which fruit pickers may walk and stand to pick fruit from trees;

lower conveyor means extending longitudinally of the vehicle to move empty fruit receptacles to a filling station on the vehicle and to discharge the filled receptacles from the filling station; and conveying means to convey picked fruit from the region of the elevated platform to the filling station, said conveying means including a support structure extending downwardly from the region of the elevated platform to the filling station, said conveying means further including a series of power-actuated resiliently compliant rollers to yieldingly grip the individual pieces of fruit from opposite sides thereof to lower the fruit from the region of the elevated platform to said filling station.

11. A combination as set forth in claim 10 in which said support structure for the rollers is adjustable upwardly to clear a receptacle entering the filling station and is adjustable downwardly to extend into an empty receptacle at the filling station.

12. A combination as set forth in claim 10 in which said support structure for the rollers is pivotally supported near its upper end to swing upwardly to clear a receptacle entering a filling station and to swing downwardly to extend into an empty receptacle at the filling station.

13. A combination as set forth in claim 12 in which a portion of said elevated platform is hinged to swing upwardly out of a normal generally horizontal position; and which includes means on the support structure to swing the hinged portion of the platform upwardly out of the path of the upward swinging movement of the support structure.

14. A combination as set forth in claim 13 which includes fluid-pressure-actuated means to swing said support structure upwardly.

15. A combination as set forth in claim 10 in which said conveying means further includes a longitudinal conveyor in the region of the elevated platform to receive the picked fruit and to feed the picked fruit to the series of rollers.

16. A combination as set forth in claim 15 in which said longitudinal conveyor is above the level of the elevated platform for the convenience of the fruit pickers.

References Cited

UNITED STATES PATENTS

| | | | |
|---|---|---|---|
| 3,273,667 | 9/1966 | Hiyama | 182—131 |
| 3,311,191 | 3/1967 | Hiyama | 182—131 |
| 3,352,380 | 11/1967 | Barney | 182—131 |
| 3,356,181 | 12/1967 | Granger | 182—131 |

REINALDO P. MACHADO, Primary Examiner

U.S. Cl. X.R.

182—131, 141; 214—83.1

UNITED STATES PATENT OFFICE
CERTIFICATE OF CORRECTION

Patent No. 3,512,609          Dated   May 19, 1970

Inventor(s)  John M. Ross

It is certified that error appears in the above-identified patent and that said Letters Patent are hereby corrected as shown below:

Column 4, line 18, "pin" should read --bin--; line 39, "back" should read --deck--. Column 5, line 66, "in" (first occurrence) should read --is--. Column 12, line 7, "existing" should read --extending--.

SIGNED AND SEALED

MAR 2 1971

(SEAL)
Attest:

Edward M. Fletcher, Jr.
Attesting Officer

WILLIAM E. SCHUYLER, JR.
Commissioner of Patents